United States Patent
Shadwell et al.

(10) Patent No.: US 6,542,203 B1
(45) Date of Patent: Apr. 1, 2003

(54) DIGITAL RECEIVER FOR RECEIVING AND DEMODULATING A PLURALITY OF DIGITAL SIGNALS AND METHOD THEREOF

(75) Inventors: Peter Wardlow Shadwell, Basingstoke (GB); Adrian Charles Paskins, Basingstoke (GB)

(73) Assignee: Sony United Kingdom Limited, Weybridge (GB)

(*) Notice: Subject to any disclaimer, the term of this patent is extended or adjusted under 35 U.S.C. 154(b) by 0 days.

(21) Appl. No.: 09/438,554

(22) Filed: Nov. 10, 1999

(30) Foreign Application Priority Data

Nov. 12, 1998 (GB) .............................. 9824877

(51) Int. Cl.[7] .......................... H04N 5/455; H04N 5/50
(52) U.S. Cl. ....................... 348/726; 348/725; 348/731; 348/732; 375/316
(58) Field of Search ................. 348/726, 725, 348/724, 723, 729, 731, 732, 733, 553, 554, 555, 564, 565; 375/324, 316; 329/316, 304, 306

(56) References Cited

U.S. PATENT DOCUMENTS

| 5,285,284 | A | * | 2/1994 | Takashima et al. | 348/731 |
|---|---|---|---|---|---|
| 5,570,136 | A | * | 10/1996 | Kim | 348/725 |
| 5,598,222 | A | | 1/1997 | Lane | 348/568 |
| 5,671,253 | A | * | 9/1997 | Stewart | 375/316 |
| 5,724,105 | A | * | 3/1998 | Hatano | 348/725 |
| 5,757,441 | A | * | 5/1998 | Lee et al. | 348/731 |
| 5,808,659 | A | | 9/1998 | Coutinho et al. | 725/141 |
| 5,828,421 | A | | 10/1998 | Boyce et al. | 348/565 |
| 5,862,186 | A | * | 1/1999 | Kumar | 375/324 |
| 5,892,799 | A | * | 4/1999 | Jaakkola | 375/340 |
| 5,933,192 | A | * | 8/1999 | Crosby et al. | 348/387 |
| 6,014,547 | A | * | 1/2000 | Caporizzo et al. | 455/6.2 |
| 6,115,419 | A | * | 9/2000 | Meehan | 375/233 |
| 6,118,498 | A | * | 9/2000 | Reitmeier | 348/725 |
| 6,133,964 | A | * | 10/2000 | Han | 348/726 |
| 6,249,180 | B1 | * | 6/2001 | Maalej et al. | 329/304 |
| 6,252,634 | B1 | * | 6/2001 | Yuen et al. | 348/731 |
| 6,356,598 | B1 | * | 3/2002 | Wang | 375/321 |

\* cited by examiner

Primary Examiner—John Miller
Assistant Examiner—Jean W. Désir
(74) Attorney, Agent, or Firm—Frommer Lawrence & Haug LLP; William S. Frommer; Dennis M. Smid

(57) ABSTRACT

A method of receiving and demodulating a plurality of digital signals transmitted with different respective carrier frequencies and a digital receiver for receiving and demodulating a plurality of digital signals transmitted with different respective carrier frequencies wherein the carrier frequency signals are down converted to respective base-band signals and digitized and a common demodulator is provided to demodulate the respective digitized base-band signals in a time division manner.

12 Claims, 5 Drawing Sheets

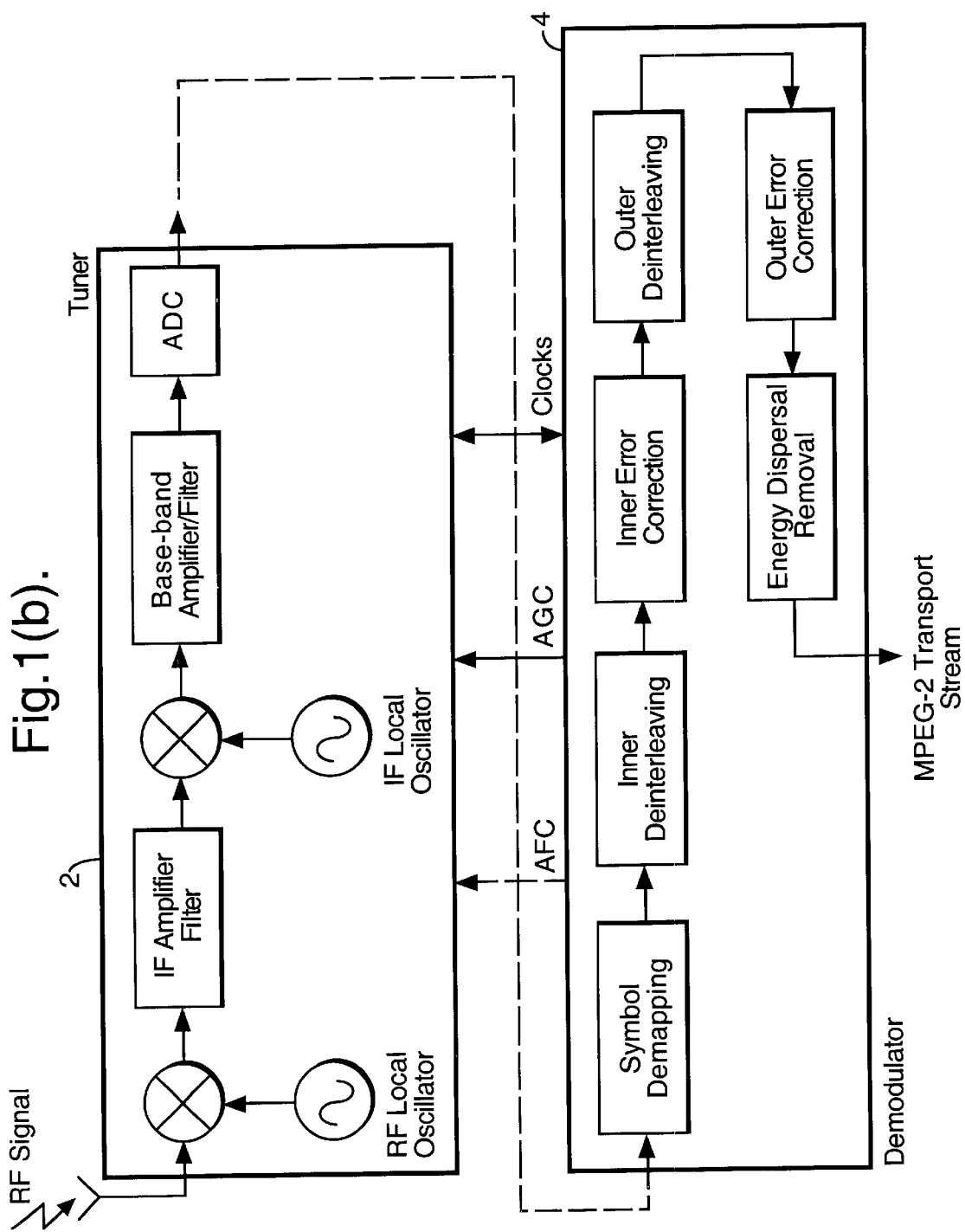

DIGITAL RECEIVER FOR RECEIVING AND DEMODULATING A PLURALITY OF DIGITAL SIGNALS AND METHOD THEREOF

BACKGROUND OF THE INVENTION

1. Field of the Invention

The present invention relates to a digital receiver, more particularly to a digital receiver for receiving and demodulating and a method of receiving and demodulating digital signals transmitted using various carrier frequencies.

2. Description of the Related Art

The Digital Video Broadcasting (DVB) organisation has specified a set of standards for encoding, modulation and transmission of digital TV channels. These digital channels offer advantages over conventional analogue TV channels in terms of greater bandwidth and power efficiency as well as robustness to interference and noise. The standards are being adopted in Europe and in other markets world-wide. The standards have been developed for cable (DVB-C as defined in ETS300 429 digital broadcasting systems for television sound and data services; framing structure, channel coding and modulation for cable systems), satellite (DVB-S as defined in ETS300 421 digital broadcasting systems for television sound and data services; framing structure, channel coding and modulation for 11/12 GHz satellite services) and terrestrial (DVB-T as defined in ETS300 744 digital broadcasting systems for television sound and data services; framing structure, channel coding and modulation for digital terrestrial television) digital television systems.

The DVB specify the various source coding and transmission methods used. Systems first compress the digital video using the MPEG-2 algorithm as defined in ISO/IEC 13818-2 Generic Coding of Moving Picture and Associated Audio:video. This allows many more channels to be carried in the same bandwidth. The compressed video stream is then coded using forward error correction (FEC) techniques. This allows the system to cope with noise and interference introducing bit errors into the bit stream. The error-protected stream is then timemultiplexed up with other compressed video and audio streams and other data into an MPEG-2 transport stream as defined in ISO/IEC 13818-1 Generic Coding and Moving Picture and Associated Audio:systems. This transport stream is then converted into a sequence of modulated symbols for transmission over the broadcast channel.

The mapping of the bit stream into symbols depends upon the modulation system used. Presently different modulation schemes are used for each type of system. Hence, QAM (Quadrature Amplitude Modulation) is used for cable systems, QPSK (Quadrature Phase Shift Keying) for satellite systems and COFDM (Coded Orthogonal Frequency Division Modulation) for terrestrial systems.

OBJECTS OF THE INVENTION

The digital TV receiver tunes to the digital TV broadcast channel and demodulates the received symbols into a bit stream. The bit stream is error corrected and decompressed to allow the recovery and display of the transmitted pictures. The digital TV is considerably more complex and therefore expensive than conventional analogue TV receivers. This is mainly due to the complex silicon devices needed to demodulate, decode and decompress a received digital signal into TV picture frames.

The increased cost can be offset against improved efficiency, functionality and interactivity offered by digital TV systems. However, recreation of some features of analogue receiver systems could significantly increase the cost of a digital television receiver and hence impede widespread adoption of digital TV receivers.

It is expected that users of digital TV receivers will expect those receivers to have at least the same functionality and features as the previous analogue receiver systems. This is particularly true in the case of integrated digital television systems having a number of different parts, such as at least a display and a recording means.

The present application recognises for the first time particular problems where a digital receiver system attempts to duplicate the functions of an analogue receiver system having a number of independent receivers. In particular, to produce the function of picture-in-picture (PIP) or to be able to record one television program whilst displaying a different television program, a digital system will require two independent digital receivers.

As mentioned above, the complexity of the demodulation process used in digital TV systems makes the digital TV receivers expensive. The provision of two or more receivers in a digital TV system will significantly increase the cost of the overall system.

SUMMARY OF THE INVENTION

According to the present invention, there is provided a digital receiver for receiving and demodulating a plurality of digital signals transmitted with different respective carrier frequencies, comprising:

a plurality of tuners, each for down converting a respective carrier frequency signal to a respective base-band signal and then digitising the respective base-band signal and each having a respective output at which the respective digitised base-band signal is provided; wherein a demodulator is provided to receive the respective outputs of each of the plurality of tuners for demodulating the digitised base-band signals in a timed division manner.

According to the present invention there is also provided a method of receiving and demodulating a plurality of digital signals transmitted with different respective carrier frequencies comprising:

down converting carrier frequency signals to respective base-band signals and digitising the respective base-band signals; and providing a common demodulator for demodulating the respective digitised base-band signals in a time division manner.

In this way, the expensive and complex demodulation process is carried out in a single unit for two or more different tuning sections. Hence, with only one demodulation section, a digital television system can tune to one channel for a main picture and another channel for a picture-in-picture. Similarly, the system can tune to a separate channel for recording a program.

Preferably, each tuner is independently tunable to allow independent selection of the two or more channels chosen by the user.

Each of the plurality tuners may additionally be provided with functions of amplifying and filtering the down converted base-band signal and the demodulator may provide separate respective automatic gain control and automatic frequency control to each of the plurality of tuners. In this way, each tuner can provide an output signal which is appropriate for use by the demodulator irrespective of the nature of the particular signal which the tuner receives. The gain, filtering and frequency control of each tuner may be independently varied to provide the same levels of output for the demodulator.

Preferably, each respective digitised base-band signal is provided to a separate input of a multiplexer, such that the demodulator may selectively demodulate the signals received at each input. In this way, the demodulator may demodulate signals from the tuners in a time division manner. The demodulator itself may have two inputs and internally be provided with a multiplexing function. Alternatively, the multiplexer may be provided as part of other control circuitry connecting the tuners to the demodulator. In this way, the demodulator is provided with a single input comprising time division multiplexed signals from both of the tuners.

Preferably, a respective buffer is provided at the output of each of the plurality of tuners, each buffer being sufficient to hold at least one received symbol. In this way, signals output from the tuners may be read into the respective buffers at a standard rate, but output at an increased rate so as to allow time division multiplexing.

The demodulator section can operate under such a clock frequency as to allow demodulation of received symbols at twice or more than the normal rate since the demodulation process clock rate can be made independent of the received symbol clock rate.

The demodulator section can also independently process received symbols from two or more sources and can save the state of a process on a particular source of received symbols whilst processing other sources.

Preferably, the buffers are dual port FIFOs and the demodulator provides an output clock to the buffers so as to receive the respective digitised base-band signals at at least twice the rate at which they are stored in the buffers so as to enable at least two signals to be demodulated in a time division manner.

Preferably, the invention may be incorporated in a digital television receiver for receiving and demodulating signals from at least one of a cable, a satellite and a terrestrial source.

The digital television receiver may be incorporated into a television apparatus having a display for displaying images produced from at least one of the demodulated signals.

The apparatus may comprise means for producing on the display a main picture from one of the at least one of the demodulated signals and a picture-in-picture image from another of said least one of the demodulated signals.

The apparatus may also comprise a data recorder for selectively recording the at least one or another of the demodulating signals.

In this way, two television images may be displayed simultaneously. Additionally, a television image may be recorded independently of one or more television images being displayed on the television display.

BRIEF DESCRIPTION OF THE DRAWINGS

FIG. 1(b) illustrates a block diagram of the front end of a digital TV receiver having one tuner stage and one demodulation stage;

DETAILED DESCRIPTION OF THE PREFERRED EMBODIMENT

The invention will be more clearly understood from the following description, given by way of example only, with reference to the accompanying drawings.

Figure 1A:
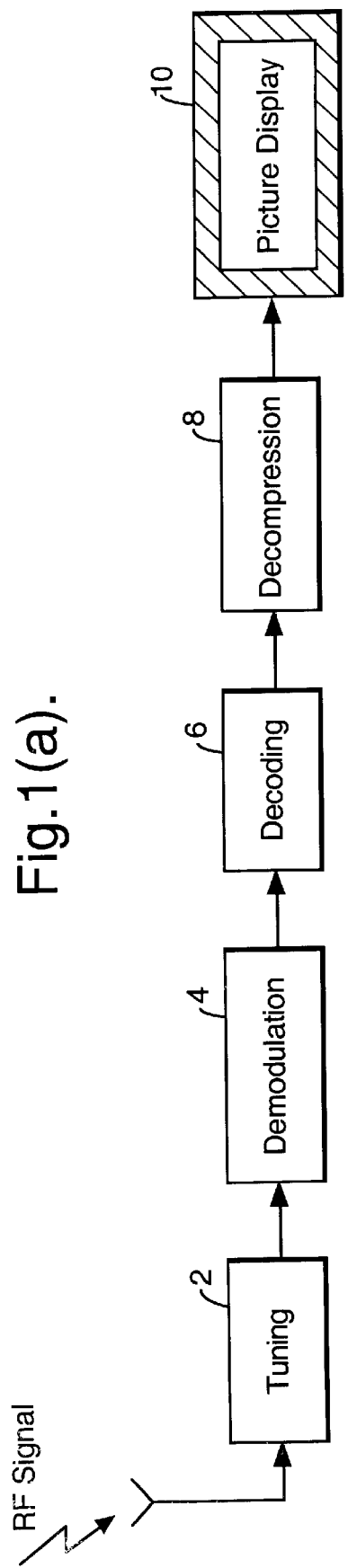
FIG. 1(a) illustrates the functional structure of a digital TV receiver.

The basic functional structure of a digital TV receiver is shown in FIG. 1(a).

The tuning function 2 of the digital TV receiver is similar to that of an analogue TV receiver. It uses the same principle of using the output of a local oscillator to mix with an incoming RF signal to down-convert it to an intermediate frequency which is then amplified and filtered. The tuning stage 2 of the digital receiver differs in that its performance has to be better than an analogue tuner and in that its final stage is an analogue to digital converter (ADC). The output digital samples are processed by the demodulation stage 4 to produce a digital bit steam for decoding.

The demodulation 4 and decoding 6 stages of the digital TV receiver are very different to those of an analogue receiver. The digital TV receiver uses digital signal processing functions to recover the bit stream from the received symbols. Forward error correction techniques are then used to produce an error free bit stream for decompression 8 and display 10. The digital signal processing functions will in general be fairly silicon intensive, for example the DVB-T system could require the use of an 8192 point Fast Fourier Transform as part of the demodulation function. The increased complexity leads to increased cost and therefore higher receiver costs for digital TV systems.

A functional block diagram of a digital TV receiver tuner 2 and demodulation stage 4 is shown in FIG. 1(b).

The tuner block 2 shows the down-conversion of the received signal down to base-band using a two stage conversion process. The base-band signal is then sampled and digitised by the ADC and passed onto the demodulation stage 4. The demodulation stage 4 shows the basic blocks and the DVB channel coding system, although these may vary depending upon whether the system is satellite, cable or terrestrial.

The illustrated apparatus includes primary communication between the tuner 2 and demodulation 4 stages in the form of three signals.

There is some form of clock synchronisation between the tuner 2 and demodulator 4 to ensure samples are clocked into the demodulator at the correct time after conversion.

There is an AFC (automatic frequency control signal), although it is not necessary in some receivers. The AFC signal is a control signal driven by the demodulation stage 4 to adjust the down conversion local oscillator frequency. This is to allow for frequency offset errors both in the transmitted frequency and the receiver local oscillators. The AFC control is the feedback of a closed loop control system on the local oscillator frequency.

The AGC (automatic gain control signal) is a control signal to adjust the gain of the tuner amplifiers. This is to ensure that the signal input to the ADC uses the full ADC input range, whatever the original RF input signal level. The RF signal will vary depending upon the environment, transmitted power and distance from the transmitter. If the signal is too low at the ADC then the quantisation noise introduced by the digitisation process will be too large, if it is too high then the ADC will be overloaded. The AGC signal allows the system to cope with a wide range of input signal levels. The signal forms the feedback path of a closed loop control system controlling the signal level into the ADC.

As discussed above, in previous analogue television receiver systems, it has been possible to provide a picture-in-picture function.

This allows the user to display another picture inset in the main picture. This inset picture can take up about ⅛ to a ½ of the main picture and can be sourced from another received channel or from the auxiliary SCART inputs for VCR playback for example. This allows the user to watch one channel whilst monitoring another. As discussed above there is no reason why a user of digital TV receiver would not expect picture-in-picture functionality when it is already available with analogue TV receivers.

To implement a picture-in-picture function on a digital TV receiver it would be possible to provide two tuners 2 and demodulators 4 providing two separate transport streams. Each of the separate transport streams would contain all of the program streams transmitted on the particular carrier frequency. The required program stream could then be demultiplexed from each transport stream and passed to the decoder. The picture-in-picture decoding could thus be implemented using two MPEG-2 decoder chipsets.

It would be possible to avoid the need for two demodulation chipsets if the displayed programs are both taken from the same transport stream. However, this is considered too restrictive and complicated for the user who probably has no concept of transport streams. Therefore, to implement this function, two demodulation chipset are required. As mentioned earlier, the cost of these chipsets would probably be prohibitive for the marginal benefit gained from the picture-in-picture functionality. It is therefore likely that the picture-in-picture function would not be provided in digital TV receivers.

Another function used extensively by current TV viewers is the recording of one program whilst watching another. This is accomplished by having separate tuners in the TV and VCR allowing each to tune to the required program. Again, users expect a similar functionality from a digital TV system.

Digital storage peripherals will allow the storage of digital material from digital TV receivers. With the growing acceptance of satellite and cable systems, users will want to record from many different sources, implying many different modulation techniques. Hence, it is proposed that digital storage peripherals will not implement any particular type of demodulator, since this would constrain their use to that particular system, for instance satellite systems.

Figure 2:
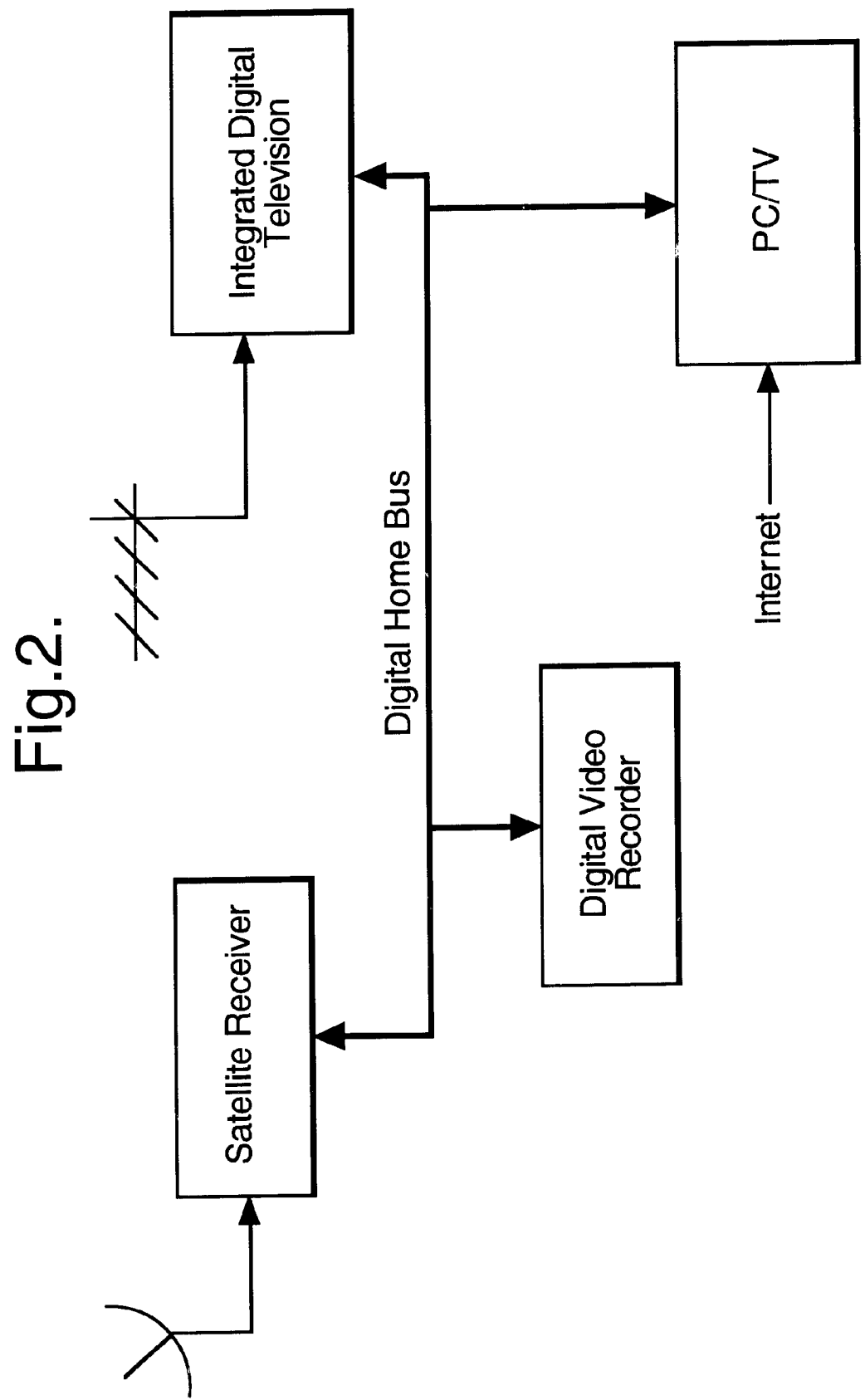
FIG. 2 illustrates a digital TV system to which the present invention can be applied.

It is proposed that a digital storage peripheral should make a direct digital connection to a digital TV receiver and receive the demodulated data from the receiver in use. FIG. 2 illustrates an example of such a configuration.

A first application for the DVCR is the provision of time shifted viewing where a program is recorded for viewing later. If the viewer is not watching any other program when the program is transmitted then the desired program can be demodulated using the demodulator of the receiver and then transmitted digitally to the DVCR. However, a common application for a VCR is the recording of one program whilst watching another.

Again this presents the problem for the receiver implementation as to how to provide one channel for display and another for recording.

The first solution would be to implement two tuners and channel demodulators to provide the two transport streams containing respectively the program to be recorded and the program to be displayed. However, as discussed above, implementing two channel demodulators would increase the cost of digital TV receivers.

Figure 3:
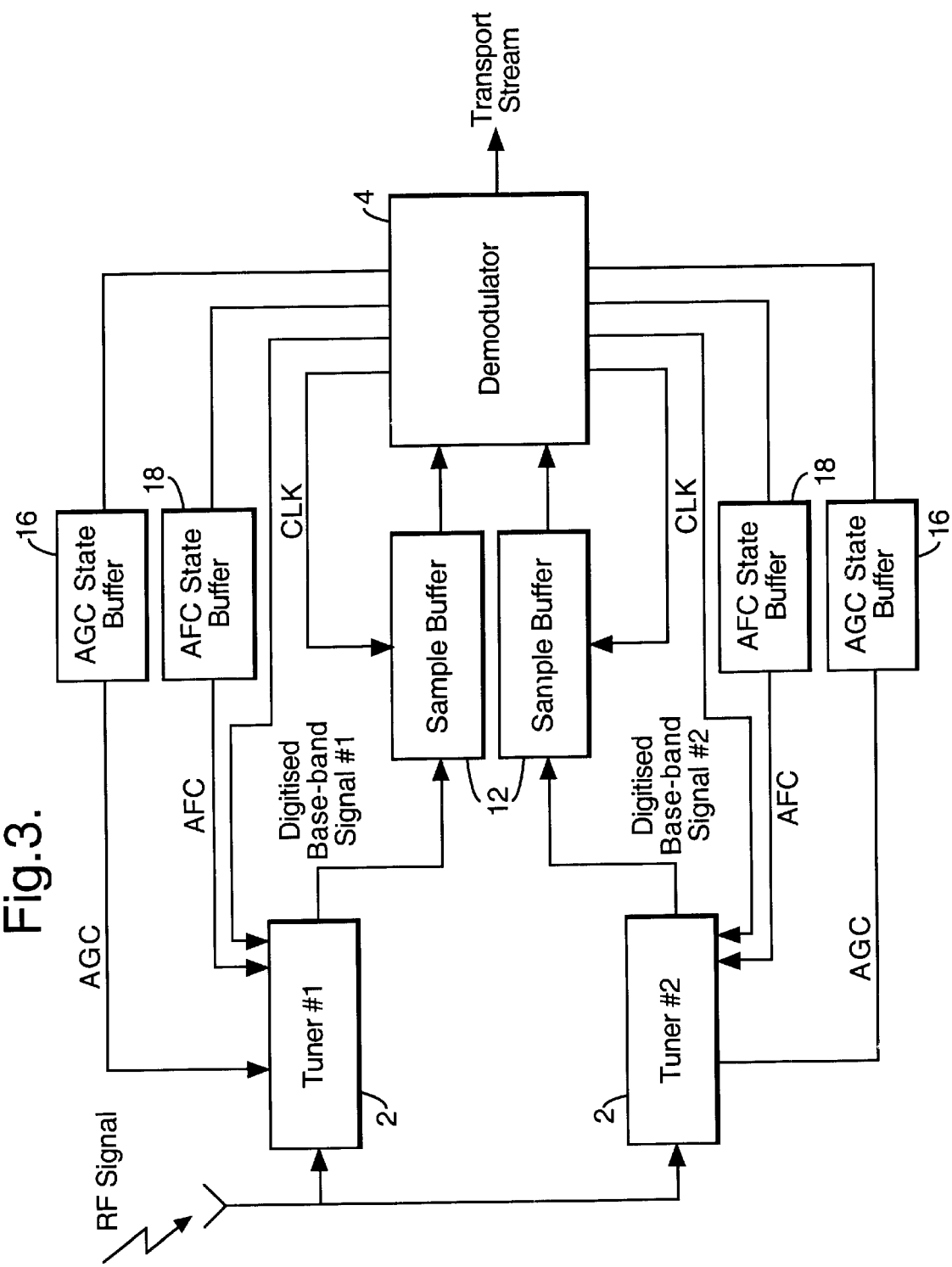
FIG. 3 illustrates the front end of a digital TV receiver having two tuners and a single demodulator.

An embodiment of the present invention is shown in FIG. 3.

Two tuners 2 are implemented, each can be tuned independently to an RF channel. The tuner section 2 down-converts, amplifies and filters the input signal. The resulting base-band signal is then sampled and converted to a digital value. The output from each tuner section is the digitised base-band signal.

The digitised output from each tuner 2 is fed into a buffer 12, which stores the digitised values. The buffers 12 are each of sufficient size to hold samples for at least one received symbol.

The output of each buffer 12 is fed into an independent input of the demodulator section 4. The demodulator section 4 also controls the tuner sections 2 independently using separate AFC and AGC lines for each tuner 2.

The transport stream output from the demodulator 4 contains the transport streams from each of the RF channels tuned to by the tuner sections.

Figure 5:
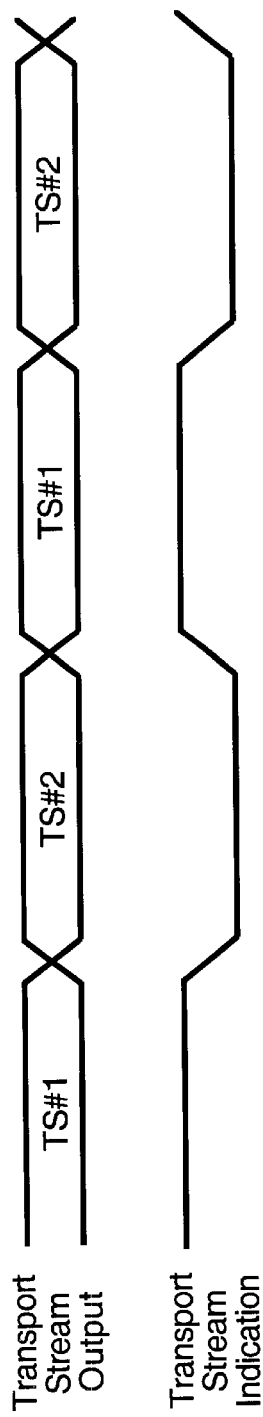
FIG. 5 illustrates a transport stream output of the demodulator of FIGS. 3 or 4.

The transport stream output from the demodulator can be output in one of two ways. Separate transport stream outputs can be provided—this is simple to implement, but has the disadvantage that extra pins are used to provide the transport stream output. For instance, if the output is a clocked parallel byte steam, 10 output pins may be required. Alternatively, the transport stream output can be time-multiplexed between the two streams in the way shown in FIG. 5. The output is time multiplexed between the two transport streams on the same set of output pins. A transport steam indication signal can also be provided to indicate which transport steam is being output by the demodulator 4.

The output from the tuner section 2 is base-band data, sampled at the rate normal for the modulation system being used. The sampled base-band data is then stored in the sample buffers 12; with new samples being added at the sample rate $f_{SAMPLE}$ to each buffer 12.

The buffers 12 are preferably dual port FIFOs, so that samples can be read out by the demodulator section in the same order as they were written into the FIFO by the tuner sections 2. The dual port nature of the FIFO allows the demodulator section 4 to read out the samples independently of the tuner section 2.

Figure 4:
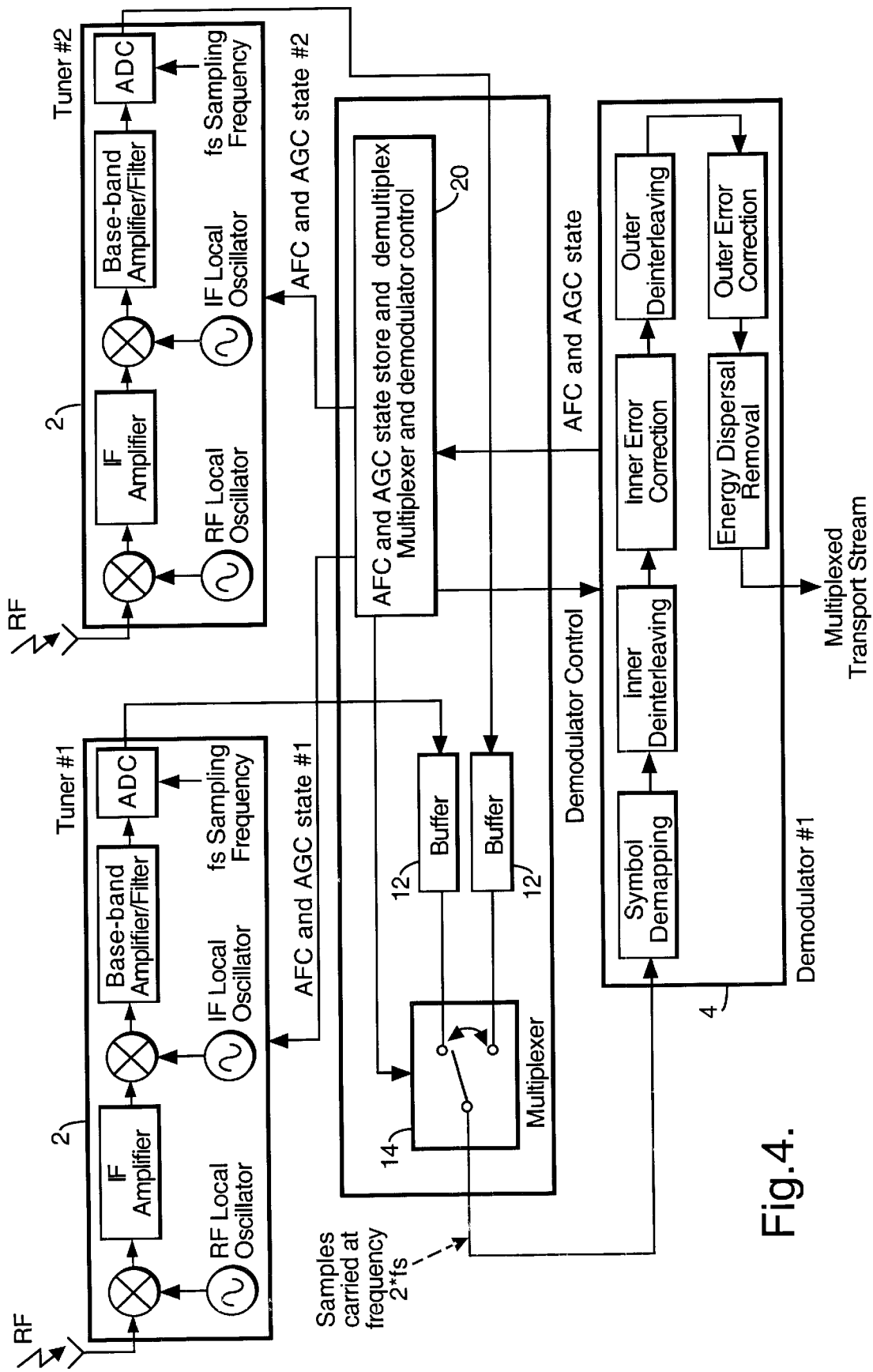
FIG. 4 illustrates an alternative arrangement to that of FIG. 3.

FIG. 4 illustrates a slightly different schematic representation of an embodiment such as that in FIG. 3.

Once again, two tuners 2 are provided each for feeding a respective buffer 12. The buffers 12 feed a multiplexer 14. In the embodiment of FIG. 3, the functionality of the multiplexer 14 is contained in the demodulator 4. However, as illustrated in FIG. 4, the multiplexer selectively switches between the buffers 12 so as to provide their outputs in a time-multiplexed way to the demodulator 4.

The demodulator 4 may be made a completely digital system. This allows the demodulator section 4 to process data at a rate dependent only on the system clock frequency. Hence, the demodulator section can read out a symbol from a sample buffer 12 and process it twice as fast as the signal is being received by the tuner 2 i.e. at a rate of $2*f_{SAMPLE}$. The demodulator section 4 output is clocked transport stream data, which again can be clocked out at any speed dependent upon the output clock speed used.

Hence, the demodulator section 4 can process a symbol from one channel twice as quickly as the symbols are being received on that channel and then use the idle time it then has to process a symbol from another channel. The demodulator section 4 can also output the data at a transport stream rate equivalent to a sample rate of $2*f_{SAMPLE}$.

The demodulator section 4 has also to save the state of each of the channel decode processes before it switches to the other channel. This is to allow the demodulator to recover the AFC and AGC values required as well as other parameters that maybe required by the demodulation process. The AGC and AFC signals will be driven independently for each channel, so that the AGC and AFC loop of one channel continues operation while data from the other channel is being processed. The AGC and AFC loops will take account of the time delay introduced by the use of the sample buffers 12. It is therefore likely that some form of digital predictive filter will be needed to eliminate the effect of the time delay on the AFC and AGC control loops.

In the embodiment of FIG. 3 buffers 16 and 18 are provided for the AGC and AFC signals. In the embodiment of FIG. 4, this functionality is illustrated by way of a common control unit 20 which also synchronises multiplexer and demodulator operation.

Although the tuner sections 2 need not work at the same clock rate as the demodulator 4, the demodulator 4 preferably supplies a synchronising clock signal. In this embodiment, this is preferably at half the rate of the clock signal supplied to the sample buffers 12.

The buffer sizes 12 are sufficient to allow sample data from one channel to be held while data from the other channel is processed. The buffers 12 also allow for the two channel symbol rates being different and out of synchronisation. An approximation of the buffer sizes can be made if it is assumed that the buffers will hold a maximum of two symbols. For a terrestrial system, a symbol can be almost 1.2 ms long, being digitised into 8 bits at 18 MHz. This works out to a buffer size of:

$$1.2*10^{-3}*18*10^6 = 43200 \text{ bytes.}$$

If more symbols need to be stored, or the sampling made at higher resolutions or rates then the buffer storage required will be correspondingly higher.

It is assumed that the demodulation section processes one symbol at a time from each channel. If the demodulation process requires longer sequences of two or more symbols for its operation, then the buffers will have to be correspondingly larger to hold the sequences of symbols of required.

We claim:

1. A digital receiver for receiving and demodulating a plurality of digital signals transmitted with different respective carrier frequencies, comprising:
    a plurality of tuners, each for down converting a respective carrier frequency signal to a respective base-band signal and then digitising the respective base-band signal and each having a respective output at which the respective digitised base-band signal is provided;
    a respective buffer at the output of each of the plurality of tuners for receiving and storing therein the respective digitised base-band signal, each buffer being sufficient to hold at least one received symbol;
    a demodulator to receive the respective outputs of each of the plurality of tuners from the buffers for demodulating the digitised base-band signals in a time division manner;
    wherein the buffers are dual port FIFOs and the demodulator provides an output clock to the buffers so as to receive the respective digitised base-band signals at at least twice the rate at which they are stored in the buffers so as to enable at least two signals to be demodulated in a time division manner.

2. A digital receiving according to claim 1 wherein each of the plurality of tuners is independently tunable.

3. A digital receiver according to claim 1 wherein each of the plurality of tuners is additionally for amplifying and filtering the down converted base-band signal.

4. A digital receiver according to claim 3 wherein the demodulator provides separate respective automatic gain control and automatic frequency control to each of the plurality of tuners.

5. A digital receiver according to claim 1 wherein each respective digitised base-band signal is provided to a separate input of a multiplexer such that the demodulator may selectively demodulate the signals received at each input.

6. A digital receiver according to claim 1 wherein the demodulator is for outputting a transport stream in which the modulated signals are time multiplexed.

7. A digital television receiver for receiving and demodulating signals from at least one of a cable, a satellite and a terrestrial source, comprising:
    a digital receiver according to claim 1.

8. A television apparatus comprising a digital television receiver according to claim 7 and a display for displaying images produced from at least one of the demodulated signals.

9. An apparatus according to claim 8 wherein the apparatus comprises means for producing on the display a main picture image from one of said at least one of the demodulated signals and a picture-in-picture image from another of said at least one of the demodulated signals.

10. An apparatus according to claim 8 wherein the apparatus comprises a data recorder for selectively recording said at least one or another of the demodulating signals.

11. An apparatus according to claim 9 wherein the apparatus comprises a data recorder for selectively recording said at least one or another of the demodulating signals.

12. A method of receiving and demodulating a plurality of digital signals transmitted with different respective carrier frequencies comprising the steps of:
    down converting carrier frequency signals by use of a plurality of tuners to respective base-band signals and digitising the respective base-band signals;
    storing the respective digitised base-band signal from each tuner in a respective buffer located at the output of the respective tuner, each buffer being sufficient to hold at least one received symbol;
    demodulating the respective digitised base-band signals obtained from the buffers in a time division manner by use of a demodulator; and
    wherein the buffers are dual port FIFOs and the demodulator provides an output clock to the buffers so as to receive the respective digitised base-band signals at at least twice the rate at which they are stored in the buffers so as to enable at least two signals to be demodulated in a time division manner.

* * * * *